United States Patent [19]
Norton et al.

[11] Patent Number: 4,943,445
[45] Date of Patent: Jul. 24, 1990

[54] EDIBLE DISPERSION

[75] Inventors: Ian T. Norton, Rushden; Charles R. T. Brown, Bedford, both of Great Britain

[73] Assignee: Lever Brothers Company, New York, N.Y.

[21] Appl. No.: 123,438

[22] Filed: Nov. 20, 1987

[30] Foreign Application Priority Data

Nov. 24, 1986 [GB] United Kingdom ............... 8628069

[51] Int. Cl.$^5$ ............................................. A23D 3/00
[52] U.S. Cl. .................................... 426/573; 426/602; 426/603; 426/804
[58] Field of Search ............... 426/602, 603, 573, 804

[56] References Cited

U.S. PATENT DOCUMENTS

| | | | |
|---|---|---|---|
| 2,864,706 | 12/1958 | Stoloff | 426/271 |
| 3,956,173 | 5/1976 | Towle | 252/316 |
| 3,962,482 | 6/1976 | Comer et al. | 426/575 |
| 4,276,320 | 6/1981 | Moirano | 426/575 |
| 4,307,124 | 12/1981 | Moirano | 426/573 |

FOREIGN PATENT DOCUMENTS

| | | | |
|---|---|---|---|
| 185755/80 | 12/1980 | Japan . | |
| 109879 | 7/1982 | Japan . | |
| 2084171 | 10/1984 | United Kingdom | 426/603 |

OTHER PUBLICATIONS

"J. Mol. Biol."(1980) 138, 349–362.
"Faraday Discuss. Chem. Soc." (1974), 57, 230–237.

Primary Examiner—Donald E. Czaja
Assistant Examiner—Celine T. Callahan
Attorney, Agent, or Firm—Milton L. Honig

[57] ABSTRACT

The invention pertains to an edible dispersion and a process for making same, comprising an aqueous and a fat phase, the aqueous phase being gel-forming and comprising carrageenan and a cation of a type and in a concentration effective to cause the aqueous phase to have a transition midpoint temperature of below 50° C. Dispersion according to the invention can be advantageously applied in water-in-oil spreads, mayonnaise, salad dressings, etc.

14 Claims, 3 Drawing Sheets

EDIBLE DISPERSION

BACKGROUND OF THE INVENTION

1. Field of the Invention

The present invention relates to an edible dispersion comprising an aqueous phase and a fat phase, the composition constituting the aqueous phase being a gel-forming composition, and to a process for the preparation thereof.

2. The Related Art

In edible dispersions comprising a fat phase and an aqueous phase, such as, for example, margarine, mayonnaise and bread spread, the composition that constitutes the aqueous phase often is a gel-forming composition. For various reasons, for example to obtain good in-mouth properties, it can be desirable to employ an aqueous phase composition that forms a gel having a relatively low melting point. The gelling agent commonly used for this purpose is gelatin. With gelatin, aqueous gels can be made that usually have a melting point of about 30°–35° C. Gelatin can be used to prepare very weak gels but, alternatively, rather firm gels can suitably be obtained with gelatin as well. For example, the gel strength of aqueous gelatin gels, as indicated by the yield stress at 5° C., may range from about 0.1 kN/m² to about 200 kN/m² Gelatin gels usually are rather elastic. However, the use of gelatin is not without disadvantages. For example, gelatin is a rather expensive gelling agent. Also, the gelatin gel sets rather slowly, which can be undesirable. Despite these disadvantages, however, a commercially acceptable gelling agent that provides relatively low melting gels and that can be used in the composition that is to constitute the aqueous phase of edible dispersions, as an alternative to gelatin, has never been found.

Kappa- and iota-carrageenan are well-known polysaccharide gelling agents. However, gels prepared with commonly available carrageenan compositions have high melting points. The gel melting point of aqueous phase compositions comprising carrageenan is often as high as 55° C. or even higher. This is considered undesirable because it prevents the edible dispersion from breaking down rapidly and releasing its flavour in the mouth. Moreover, carrageenan gels commonly set very rapidly. Consequently, when using an aqueous phase composition comprising carrageenan as gelling agent, the gel tends to set early in the production process, which can give rise to very high line pressures. Because of these disadvantages, in practice carrageenan is only used to a limited extent as gelling agent in aqueous phase compositions for the preparation of edible dispersions.

The melting point of a gel is the temperature at which the gel network structure disappears if the gel is heated slowly. However, in practice it is difficult to determine this temperature accurately and reliably, and it is therefore common practice to refer to the closely related transition midpoint temperature Tm, which is determined by means of optical rotation dispersion (ORD). The Tm-value of carrageenan gels commonly lies within the experimental error range of the gel melting point. However, the Tm determination via ORD depends on the transition from the ordered to the disordered state. The ordered state may be a gel, but this need not be so. Aqueous carrageenan systems may also occur in the so-called double helix state. In this state, it is believed, pairs of polymer molecules have formed, presumably in a double helix conformation, which is indicated by the ORD measurement as an ordered state, but microscopically the system is still a pourable liquid, because no wide-ranging three-dimensional network has formed. Thus, for carrageenan gels the Tm-value usually does not differ substantially from the gel melting point. However, the fact that the midpoint temperature for the order to disorder transition, Tm, can be determined does not imply that the system at the lower temperature is a gel; the ordered state may also be the non-gelled, double helix state.

Although in practice the Tm-value of a carrageenan gel is often used interchangeably with the temperature at which the gel melts, which is correct for the majority of carrageenan gels, substantial differences between the temperature at which a gel comprising carrageenan melts and the Tm-value of that gel may occur. If, for example, in a carrageenan gel composition that has a Tm value and a gel melting point of about 50° C., locust bean gum is incorporated, this can cause an increase of the temperature at which the gel melts to e.g. about 55° C. or 60° C. without changing the Tm value of the order to disorder transition. For the large majority of carrageenan gels, however, the gel melting point does not differ substantially from the Tm value.

It is well known that the properties of aqueous carrageenan systems may vary substantially in dependence of the type and quantity of ions contained in the system. For example, it is known that the solubility of carrageenan gelling agent in an aqueous medium and the elasticity and the Tm value of the carrageenan gel can be varied by changing the ionic environment. However, as described above, the known gel-forming carrageenan compositions, suitable to be used as aqueous phase composition of an edible dispersion, have undesirably high Tm-values.

SUMMARY OF THE INVENTION

It has now been found that, without using gelatin, edible dispersions can be obtained that have a gelled aqueous phase with a low gel melting point.

According to one aspect, the present invention provides an edible dispersion which comprises an aqueous phase and a fat phase, the composition constituting the aqueous phase being a gel-forming composition comprising carrageenan and containing a cation (A) of a type and in a concentration effective to cause the gel-forming composition to have a transition midpoint temperature below 50° C., the carrageenan being kappa-carrageenan, iota-carrageenan or a mixture thereof. Preferably, the cation (A) is selected from the group consisting of potassium, calcium, magnesium, ammonium and mixtures of two or more thereof. Preferably the gel-forming composition further contains a cation (B) which is sodium.

According to another aspect, the present invention provides a process for the preparation of an edible dispersion comprising a dispersed aqueous phase and a continuous fat phase wherein an oil-in-water emulsion is prepared from the fat phase and the aqueous phase compositions and the emulsion is plastified and caused to invert by subjecting it to working and cooling treatment, the phase inversion being caused to occur prior to settling of the aqueous phase gel.

DETAILED DESCRIPTION

Figure 1:
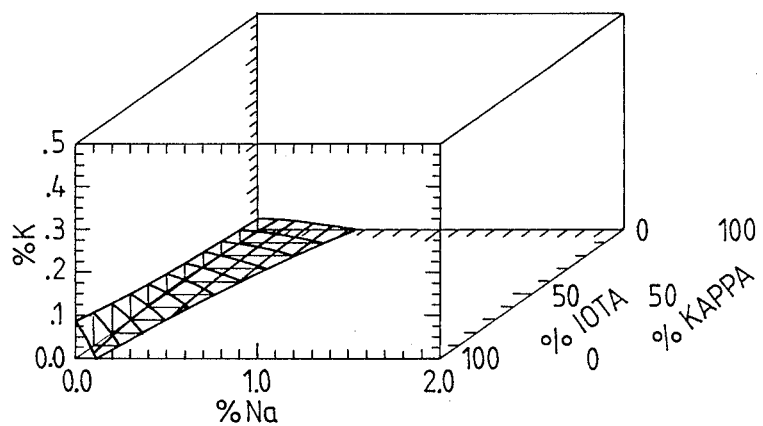
Figure 1:
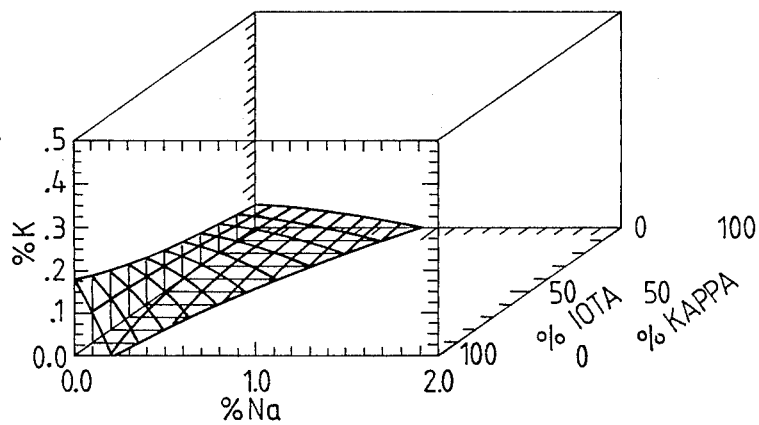
Figure 1:
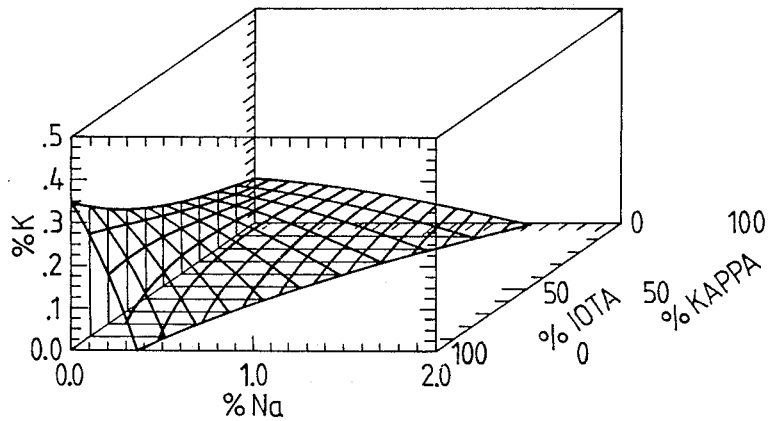

Throughout this specification, by carrageenan is meant gelling carrageenan, i.e. kappa-carrageenan, iota-carrageenan or a mixture thereof. Non-gelling carrageenan such as lambda carrageenan is explicitly indicated as such. By "salt" is meant any substance that, when dissolved in water, causes cations to be present. Thus "salt" includes materials such as for example KCl, NaOH and carrageenan.

The characteristics of the aqueous phase composition to be employed in the present edible dispersion are governed by the following properties:

The presence of cation (A) is required to obtain a suitable gel-forming composition. When using kappa-carrageenan, especially potassium-containing salts are effective. For iota-carrageenan, suitably magnesium and potassium and especially calcium can be employed to obtain a composition that forms an appropriately firm gel.

The transition midpoint Tm is determined by the ionic environment of the carrageenan polymer and is, in principle, independent of the carrageenan concentration itself. At a particular ionic composition, the Tm-value is, generally, different for kappa- and iota-carrageenan. For mixtures of kappa-and iota-carrageenan, the Tm-value varies linearly with the fractions of kappa- and iota-carrageenan in the mixture, between the two extreme Tm-values observed for the pure carrageenan forms in that ionic environment.

The gel strength at a given ionic composition is determined by the concentration of kappa- and iota-carrageenan.

The incorporation of a further cation (B), sodium, is preferred, inter alia because it reduces the brittleness of the aqueous phase gel, thereby making it more elastic and thus more like a gelatin-containing aqueous phase.

The presence of e.g. sodium chloride can further be beneficial, for example for taste reasons.

When applying these rules, it should be appreciated that carrageenan preparations always contain cations. Consequently, changing the type or concentration of carrageenan or replacing, for example, one commercial sample of kappa-carrageenan with another one, will in general cause a change in the ionic composition of the aqueous phase gel, and thereby, inter alia, in the Tm-value thereof.

However, the cations contained in a carrageenan sample can be exchanged with other cations using methods known per se. The ionic content of carrageenan samples can be analyzed accurately. Consequently, the ionic contribution of the carrageenan to the gel-forming aqueous phase composition can, to some extent, be chosen freely and can be known accurately.

The Tm-value of the gel-forming carrageenan composition is determined by the ionic content. The ionic content to be chosen to obtain an aqueous gel having a predetermined Tm-value, can be determined in the following manner. A series of kappa-carrageenan gels with various ionic contents is prepared and the Tm-values thereof are measured. Similarly, the Tm-values of a series of iota-carrageenan gels with those same ionic contents are measured. The Tm-value of a mixture of kappa- and iota-carrageenan at a given ionic composition is then determined by $$Tm^i (\text{mixture}) = X\, Tm^i_{kappa} + (1-X)\, Tm^i_{iota} \quad (1)$$

wherein X indicates the weight fraction of kappa-wherein carrageenan in the carrageenan mixture, and $Tm^i_{kappa}$, $Tm^i_{iota}$ and $Tm^i$ indicate the Tm-values in ionic environment i for kappa-carrageenan, iota-carrageenan and the carrageenan mixture, respectively.

Subsequently, Tm-values for kappa-carrageenan, iota-carrageenan and carrageenan mixtures for intermediate ionic compositions can be calculated from the data obtained, using conventional interpolation techniques. In this manner, the Tm-value for a specific ionic composition at a given ratio of kappa- and iota-carrageenan can be predicted.

A suitable way to carry out such an analysis of the experimental data is to derive expressions by which the concentrations of the various cations can be converted into equivalent concentrations of one particular cation. The ionic content of a composition can thus be characterized by a total equivalent concentration of one cation. An equation for the Tm-value can subsequently be derived, expressed as a function of that total equivalent cation concentration.

For example, it was found that for kappa-carrageenan the sodium concentration [Na$^+$] can be expressed as an equivalent potassium concentration $[K^+]^{Na}_{eq}$ by means of the following equation:

$$\ln[K^+]^{Na}_{eq} = 1.12 \ln[Na+] - 3.31 \quad (2)$$

The Tm-value for kappa-carrageenan, in °C., can be estimated from :

$$Tm = 1/(-1.61 \cdot 10^{-4} \ln[K^+]^{tot}_{eq} + 2.614 \cdot 10^{-3}) - 273 \quad (3)$$

If only Na$^+$ and K$^+$ are present, the $[K^+]^{tot}_{eq}$ equals the sum of the K$^+$-concentration and the equivalent K$^+$-concentration calculated with equation (2) for the Na$^+$-concentration :

$$[K^+]^{tot}_{eq} = [K^+] + [K^+]^{Na}_{eq}$$

If, apart from Na$^+$ and K$^+$, other cations are also present, their influence can be taken into account in a manner similar to that done for sodium.

$$\ln[K^+]^{Na}_{eq} = 1.26 \ln[Na+] - 0.53 \quad (4)$$

$$Tm = 1/(-1.71 \cdot 10^{-4} \ln[K^+]^{tot}_{eq} + 2.775 \cdot 10^{-3}) - 273 \quad (5)$$

For mixtures of kappa- and iota-carrageenan an estimate of the Tm-value for a given ionic environment can then be obtained with expression (1) by inserting the Tm-values calculated with equations (3) and (5).

Additionally, using the same experimental data, by means of mathematical methods known per se, it can be calculated with which ionic composition, in dependence of the relative amounts of kappa-and iota-carrageenan, a predetermined Tm-value can be obtained. This is illustrated in FIG. 1. The three plots show how a Tm-value of 20°, 30°or 40° C. can be obtained, depending on the fractions of kappa- and iota-carrageenan in the carrageenan composition, if the only salts to be present are potassium and sodium salts.

Figure 2:
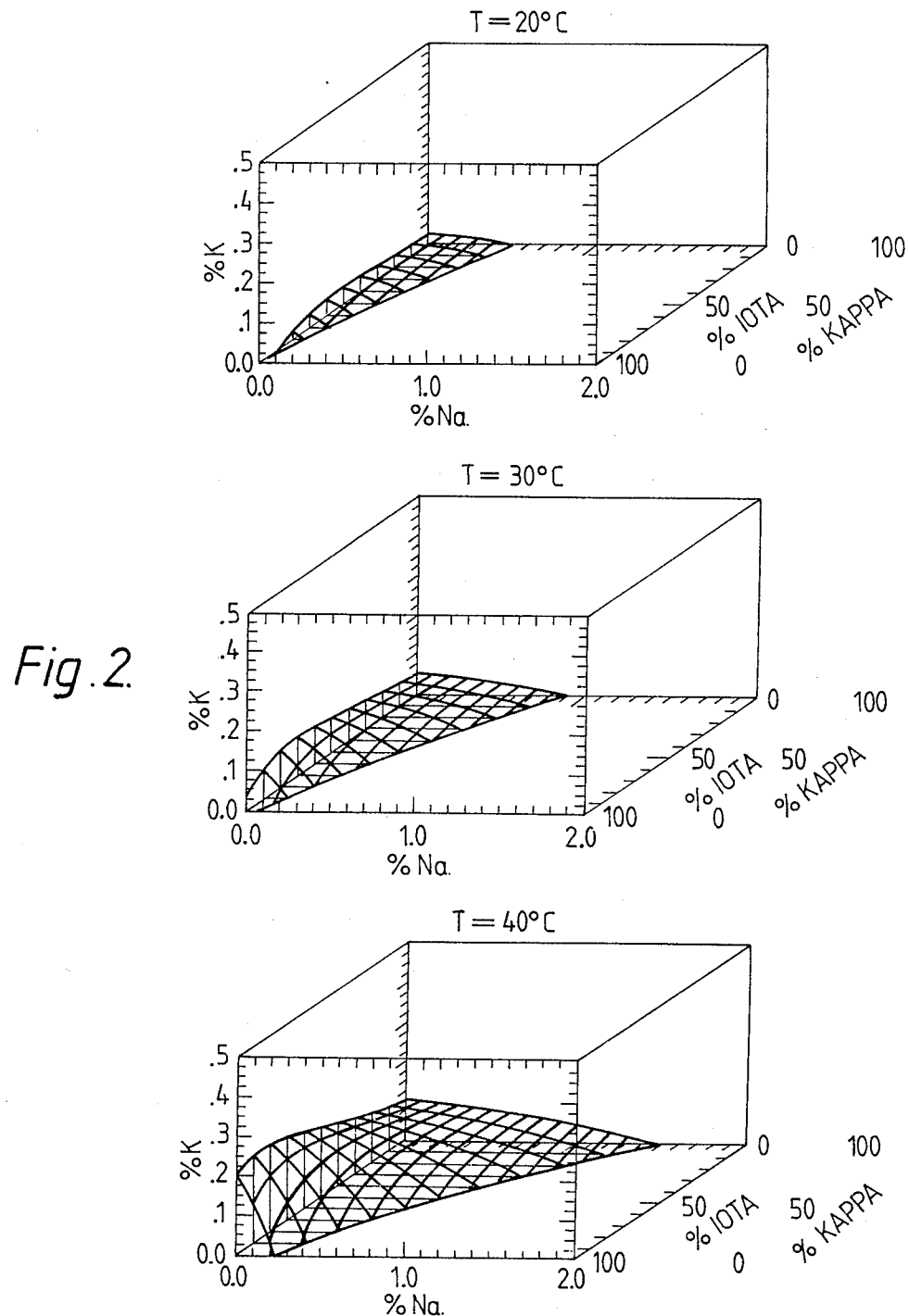

These plots can only be used to obtain a pre-selected Tm-value if essentially no cations other than potassium and sodium are included in the aqueous phase composition, which implies that the carrageenan samples to be used are in the sodium or the potassium form and that the water used to make up the gel-forming aqueous phase composition is de-ionized or distilled water. However, the ionic contributions of the carrageenan sample, or the tap water if that is to be used, can be taken into account in a straightforward manner. For example, in FIG. 2 three plots are shown corresponding to those of FIG. 1, just in case the aqueous phase compositions are to be made up using tap water containing 133 ppm $Ca^{2+}$, 6 ppm $Mg^{2+}$, 37 ppm $Na^+$ and 6 ppm $K^+$ instead of with water containing no ions.

In a similar manner the gel strength of particular compositions can be predicted. Alternatively, it can be calculated with which compositions a preselected gel strength can be obtained. In practice, however, the precise gel strength of the aqueous phase composition is usually not a critical parameter. Generally it is, therefore, sufficient to measure the gel strength of only a limited number of compositions and to choose an appropriate carrageenan concentration at a suitable ionic composition on the basis of such a limited set of data.

The gel strengths obtained for a series of gel forming compositions in which the amount of kappa- and iota-carrageenan was varied, and in which varying amounts of NaCl and KCl were included, are shown in Table 1. In Table 1, the Tm-values and the percentage deformation at rupture, indicative for the elasticity of the gels, are included also. (The kappa-carrageenan that was used to make up the gels, contained 4.82 wt.% $Na^+$ and 2.48 wt.% $K^+$; the iota-carrageenan contained 6.30 wt.% $Na^+$ and 1.60 wt.% $K^+$.)

To illustrate the above, the following procedure can be used to design a moderately strong carrageenan gel having a Tm-value of about 30° C. and containing for taste reasons about 0.5 wt.% NaCl and to ensure microbiological stability 0.05 wt.% potassium sorbate. The available gelling agents are iota-carrageenan containing 6.30 wt.% $Na^+$ and 1.60 wt.% $K^+$ and kappa-carrageenan containing 4.82 wt.% $Na^+$ and 2.48 $K^+$ Deionized water is to be used to make up the gel.

One of the ways to approach this problem is to estimate first how much carrageenan can be used while keeping the Tm-value below about 30° C. Increasing the carrageenan content causes an increase of the $Na^+$ and $K^+$ concentrations and thereby of the Tm-value. The Tm-values, estimated using equations 1-5, for compositions containing, apart from 0.5 wt.% NaCl ([$Na^+$]=0.086 M) and 0.05 wt.% potassium sorbate ([$K^+$]=3.33 mM), varying amounts of either the kappa-carrageenan or the iota-carrageenan or a 1:1 weight mixture of the two, are shown in Table 2.

The table shows that when using more than 1.5 wt.% carrageenan, whether kappa-, iota- or the 1:1 mixture, the Tm-value will become too high.

TABLE 2

| carrageenan | | | Total cation | | Tm(°C.) | | |
|---|---|---|---|---|---|---|---|
| polymer (wt. %) | [$Na^+$] (M) | [$K^+$] (mM) | [$Na^+$] (M) | [$K^+$] (mM) | kappa | iota | mixture |
| kappa | | | | | | | |
| 0.50 | 0.010 | 3.17 | 0.096 | 6.50 | 23.8 | | |
| 0.75 | 0.016 | 4.75 | 0.102 | 8.08 | 26.3 | | |
| 1.00 | 0.021 | 6.34 | 0.106 | 9.67 | 28.4 | | |
| 1.25 | 0.026 | 7.93 | 0.112 | 11.26 | 30.3 | | |
| 1.50 | 0.031 | 9.51 | 0.116 | 12.84 | 32.0 | | |
| 1.75 | 0.037 | 11.10 | 0.122 | 14.43 | 33.6 | | |
| iota | | | | | | | |
| 0.50 | 0.014 | 2.05 | 0.100 | 5.38 | | 26.8 | |
| 0.75 | 0.020 | 3.07 | 0.106 | 6.40 | | 28.2 | |
| 1.00 | 0.027 | 4.09 | 0.113 | 7.42 | | 29.6 | |
| 1.25 | 0.034 | 5.12 | 0.120 | 8.45 | | 31.0 | |
| 1.50 | 0.041 | 6.14 | 0.126 | 9.47 | | 32.1 | |
| 1.75 | 0.048 | 7.16 | 0.133 | 10.49 | | 33.3 | |
| kappa/iota 1:1 (wt) mixture | | | | | | | |
| 0.50 | | | 0.098 | 5.94 | 23.0 | 26.7 | 24.9 |
| 0.75 | | | 0.104 | 7.24 | 25.2 | 28.2 | 26.7 |
| 1.00 | | | 0.110 | 8.54 | 27.2 | 29.6 | 28.4 |
| 1.25 | | | 0.116 | 9.86 | 29.0 | 30.9 | 29.9 |
| 1.50 | | | 0.121 | 11.16 | 30.5 | 31.9 | 31.2 |
| 1.75 | | | 0.127 | 12.46 | 32.0 | 33.1 | 32.6 |

When using, for example, the kappa-carrageenan in an amount of about 1–1.5 wt.%, in the presence of 0.5 wt.% NaCl and 0.05 wt.%, potassium sorbate a Tm-value of 30 ± 2° C. will be obtained. If it is desirable to use less than 1% kappa-carrageenan, a Tm-value of about 30° C. can be obtained by adding additional salt, e.g. some KCl. The influence of various, additional amounts of KCl on the Tm-values can be calculated in a similar way by using equations 2 and 3. When employing the 1:1 mixture, a Tm-value of about 30° C. will also be obtained without adding extra cations, when using about 1–1.5 wt.% carrageenan polymer.

Selection of a carrageenan combination to give the desired gel strength can be made by reference to a table of gel strengths obtained from a small series of tests. (For example, comparison of tables 1 and 2, shows that about 1.5 wt.% of the 1:1 kappa/iota carrageenan mixture is likely to be appropriate to obtain a moderately strong gel with a Tm-value of about 30° C., in the presence of 0.5 wt.% NaCl and 0.05 wt.% potassium sorbate.)

Should it turn out that with the maximum polymer concentration that can be allowed to obtain a desired Tm-value, a sufficiently strong gel cannot be obtained, then one should try using carrageenan samples with different cation contents.

The anions contained in the salts with cations (A) and (B) are not critical. Suitably the anion of the salts is the carrageenan polymer, chloride, sulphate or a mixture thereof. Other anions, e.g. nitrate, can however also be

TABLE 1

| carrageenan | | Added salt | | Total cation | | | | Gel properties | | |
|---|---|---|---|---|---|---|---|---|---|---|
| polymer (wt. %) | wt. fraction kappa | NaCl (wt %) | KCl (wt %) | $Na^+$ (wt %) | (M) | $K^+$ (wt %) | (mM) | Tm (°C.) | Yield stress (kN/m²) | Deformation at rupture (%) |
| 1.5 | 0.50 | 0.8 | 0.03 | 0.39 | 0.17 | 0.023 | 5.9 | 32 | 12 | 67 |
| 1.5 | 0.50 | 0.5 | 0.07 | 0.28 | 0.12 | 0.036 | 9.2 | 30 | 23 | 65 |
| 1.5 | 0.50 | 0.33 | 0.18 | 0.21 | 0.09 | 0.065 | 16.6 | 32 | 32 | 60 |
| 1.5 | 0.25 | 0.75 | 0.05 | 0.38 | 0.17 | 0.027 | 7.0 | 34 | 12 | 74 |
| 1.5 | 0.75 | 0.5 | 0.06 | 0.28 | 0.12 | 0.034 | 8.7 | 28 | 14 | 63 |
| 1.5 | 0.75 | — | 0.16 | 0.08 | 0.03 | 0.060 | 15.4 | 29 | 6.3 | 63 |
| 1.5 | 1 | — | 0.16 | 0.07 | 0.03 | 0.064 | 16.2 | 33 | 0.8 | 42 |
| 1.0 | 1 | 2 | 0.04 | 0.83 | 0.36 | 0.025 | 6.3 | 34 | 1.4 | 81 |
| 2.0 | 1 | 1 | 0.09 | 0.49 | 0.21 | 0.050 | 12.7 | 35 | 38 | 55 |
| 4.0 | 0 | — | 0.11 | 0.25 | 0.11 | 0.064 | 16.4 | 32 | 35 | 85 | present. Suitably the salts employed are soluble in water.

The aqueous phase composition may comprise additional ingredients, e.g. taste and flavour compounds, proteins, e.g. milk proteins and preservatives. If for example, that is considered desirable, some gelatin may also be incorporated in the aqueous phase composition without adverse effects. Similarly, the aqueous phase composition may contain non-gelling thickening agent, provided it does not raise the Tm-value to above 50° C. For example, the composition may contain a non-gelling thickening agent like lambda-carrageenan.

Preferably, the Tm-value of the aqueous phase composition is 10°–45°C., more preferably it is 15°–35° C. The composition constituting the aqueous phase suitably is a composition that forms a gel having a yield stress of at least 0.5 Kn/m$^2$ when kept at 5° C. The strength of the gel formed by the aqueous phase composition when kept at 5° C. as indicated by the yield stress, is preferably 1–100 kN/m$^2$, more preferably 2–50 kN/m$^2$.

As described above, the concentration of kappa- and iota-carrageenan determines, at a given ionic composition, the strength of the gel formed by the aqueous phase composition. Conversely, the content of carrageenan that can suitably be employed varies with the ionic environment of the polymer. Usually, however, a total carrageenan content of 0.3–10 parts by weight per 100 parts by weight of water, is adequate; a total carrageenan content of 0.1–10 parts by weight per 100 parts by weight water, is adequate, a total carrageenan content of 0.2–5 parts by weight, and in particular of 0.4–3 parts by weight, per 100 parts by weight water being preferred. p Usually, the minimum amount of carrageenan required to obtain a gel network structure in aqueous systems having an ionic content as commonly occurs in the aqueous phase of edible dispersions, is about 0.3 parts by weight per 100 parts by weight water.

It is, however, possible to obtain a gel network structure, using less than 0.3 parts by weight carrageenan per 100 parts by weight water contained in the dispersion, even if ordinary ionic contents are employed. This can, for example, be achieved by reducing the effective water content of the carrageenan-containing aqueous phase composition, e.g. by incorporating part of the water phase-separated from the carrageenan-containing water. For example if the dispersion has a continuous fat phase, part of the water may be included as a dispersed non-gelling aqueous phase, whereas the remainder of the water is contained in a carrageenan-containing gel-forming composition to be dispersed in the fat phase separately. Similarly, the effective carrageenan concentration can be increased by binding part of the water with a suitable water binding agent. As a consequence, in such systems the effective carrageenan concentration can be sufficiently high to cause formation of the gel network structure, even though the carrageenan content expressed in relation to the total amount of water in the dispersion, would seem to be too low to obtain gelation.

Figure 3:
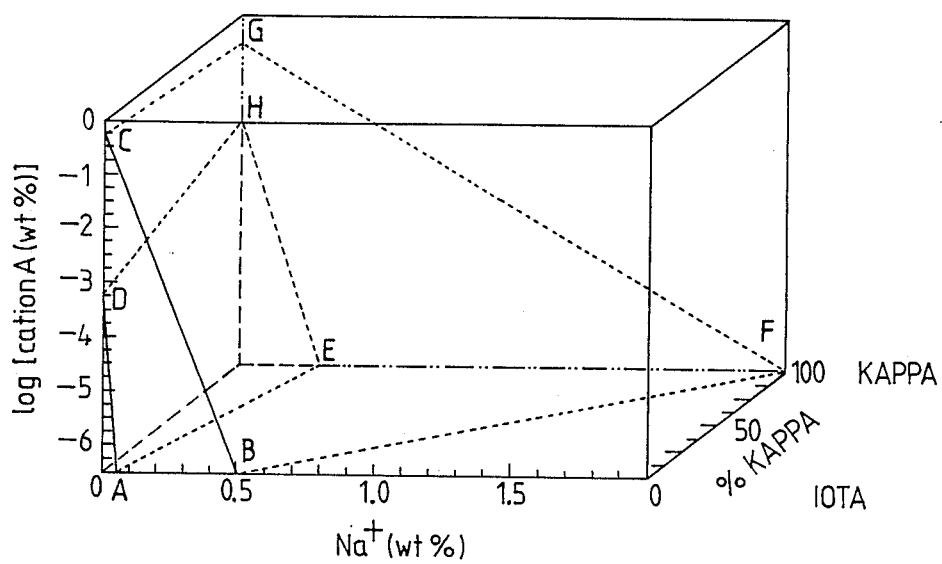

As described above, the optimal amounts of cations (A) and (B) to be present, depend on the desired transition midpoint temperature and gel strength, and on product aspects such as desired taste and microbiological stability, as well as on the precise choice of the salts with cations (A) and (B). In practice, however, it is preferred that the aqueous phase composition comprises cations (A) and (B), in dependence of the weight ratio of kappa- and iota-carrageenan present in the composition, in concentrations within the ranges corresponding to space ABCDEFGH of FIG. 3.

Figure 4:
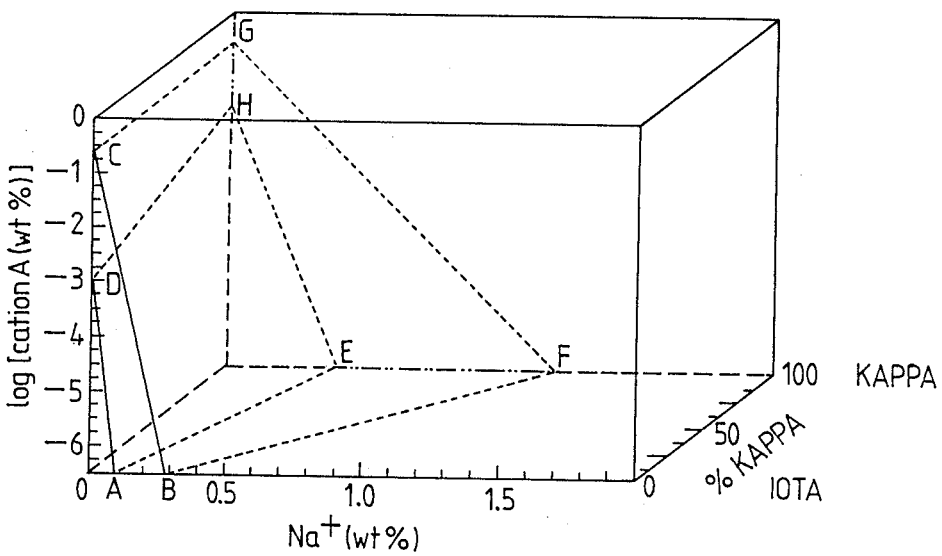

More preferred ranges for the amount of cations (A) and (B) to be present in the aqueous phase composition, correspond to space ABCDEFGH of FIG. 4.

As stated above, the gel-forming aqueous phase composition preferably comprises 0.2–5 parts by weight of carrageenan per 100 parts by weight of water. When the carrageenan employed comprises from 50–100 wt.% kappa-carrageenan and 0–50 wt.% iota-carrageenan then it is preferred for the aqueous phase composition to contain 0.01–0.25 wt.% K$^+$, 0.1–2 wt.% Na$^+$ and/or 0.04–3 wt.% Ca$^{2+}$. If, alternatively, the carrageenan consists of 50–100 wt.% iota-carrageenan and 0–50 wt.% kappa-carrageenan then preferably the composition comprises 0.01–0.6 wt.% Ca$^{2+}$, 0.01–0.7 wt.% Mg$^{2+}$, 0.05–0.5 wt.% K$^+$ and/or 0.05–1 wt.% Na$^+$.

Preferably, the edible dispersion comprises 15–90 wt.% aqueous phase and 10–85 wt.% fat phase, more preferably it comprises 35–85 wt.% aqueous phase and 15–65 wt.% fat phase.

Suitably, the present dispersion comprises a continuous aqueous phase and a dispersed fat phase. Examples of dispersions for which the present invention can beneficially be applied are, e.g. mayonnaise, salad dressing, constituted cream and water continuous spread, e.g. cheese spread and vegetable spread. Preferably, the dispersion comprises a dispersed aqueous phase and a continuous fat phase. Preferred products according to the present invention are water-in-oil spreads, suitable for use on bread as replacement for butter, e.g. margarine and low calorie spread.

The choice of fat to provide the fat phase of the present dispersion is not critical. In this application the terms oil and fat are used interchangeably. The fat employed in the present dispersion may be solid or liquid at ambient temperature.

It may, for example, consist essentially of triglycerides such as, for example, soybean oil, sunflower oil, palm oil, coconut oil, fish oil, lard and tallow, which may have been partially or completely hydrogenated or modified otherwise and mixtures thereof. It may also comprise non-toxic material having physical properties similar to triglycerides, which material may be indigestible, such as for example waxes, e.g. jojoba oil and hydrogenated jojoba oil, and poly fatty acid esters of mono- and di-saccharides, e.g. sucrose octa fatty acid ester, or mixtures thereof. Mixtures of such substances with triglycerides can also be employed.

According to another aspect, the present invention provides a process for the preparation of an edible dispersion comprising a dispersed aqueous phase and a continuous fat phase as hereinbefore described wherein an oil-in-water emulsion is prepared from the fat phase and the aqueous phase compositions and the emulsion is plastified and caused to invert by subjecting it to working and cooling treatment, the phase inversion being caused to occur prior to setting of the aqueous phase gel.

For various reasons, plastified dispersions containing a continuous fat phase and a dispersed aqueous phase, in particular those comprising at most about 65 wt.% fat, are often prepared via phase inversion. It has been found that when using such a process and a gel-forming aqueous phase composition, improved products can be obtained by ensuring that phase inversion occurs before setting of the gel. In this manner, high quality products can be obtained. If phase inversion takes place after the gel has started to set, it has been found, the product obtained may release moisture when subjected to spreading.

Such problems do not occur if it is ensured that setting of the gel occurs only after phase inversion has taken place. It is an advantage of the present invention that such a process can be carried out conveniently in practice.

When using conventional gel-forming carrageenan-containing aqueous phase compositions with high Tm-values, the aqueous phase gel starts to set at very high temperatures, early in the production line, essentially before any substantial crystallization of fat has occurred, and consequently before the phase inversion has taken place.

With the present gel-forming aqueous phase compositions of which the Tm-values, and consequently the gel setting temperatures, are substantially lower, phase inversion can be made to occur prior to setting of the gel.

For iota-carrageenan gels, little or no hysteresis occurs and the gel tends to set at essentially the same temperatures at which the gel melts. For kappa-carrageenan gels, however, the hysteresis may be substantial, and the midpoint temperature of the disorder-order transition upon cooling may be as much as 5°–10° C. lower than the Tm-value. Gels containing both kappa- and iota-carrageenan tend to exhibit hysteresis to an extent approximately proportional to the relative contents of kappa- and iota-carrageenan.

Preferably, phase inversion is caused to occur in the present process at a temperature above the temperature at which the aqueous phase gel sets. This manner to effect phase inversion prior to setting of the gel is suitable for both kappa- and iota-carrageenan containing aqueous phase compositions as well as for compositions containing mixtures of kappa- and iota-carrageenan as gelling agent.

For taste reasons, it is usual to employ fats for the preparation of edible dispersions that melt down essentially completely in the mouth. Phase inversion is commonly caused to occur via crystallization of fat.

Consequently, the temperature at which phase inversion can suitably take place is in practice well below body temperature and may be as low as 20° C. or lower. It is, therefore, preferred to employ in the present process a gel-forming aqueous phase composition having a low Tm-value, e.g. a Tm-value of 10°–35° C., more preferably of 15°–30° C.

Another preferred way to cause phase inversion prior to setting of the gel, in the present process, is by means of shear. By subjecting the oil-in-water emulsion to shearing conditions, setting of the gel can be prevented. In this manner formation of an extended three dimensional gel network can be postponed until after phase inversion has taken place, even though the temperature of the emulsion has been lowered to well below the temperature at which the gel sets if no shear conditions are applied when as carrageenan gelling agent, a composition consisting predominantly or essentially completely of iota-carrageenan is used. The shearing conditions can suitably be applied by means of, for example, a surface scraped heat exchanger, e.g. of the Votator A-unit ® type. Gelation may be allowed to take place after the phase inversion, for example by including in the production line a resting tube after the unit in which the phase inversion is made to occur.

Another advantage of the present process, apart from obtaining good quality products that do not loose moisture when spread, is that it can be carried out at substantially lower line pressures, than when gelation takes place before phase inversion at relatively high temperatures at an early stage of the process. In the following examples, the midpoint temperature (Tm) of the transition from the ordered to the dis-ordered state is determined by means of optical rotation measurement as described in Faraday Discuss. Chem. Soc. (1974), 57, 230–237. The yield stress is determined by measuring the force at break at 5° C., using the procedure as described in J. Mol. Biol. (1980) 128, 340–362, and dividing the measured force by the cross sectional area (i.e. $1.13 \cdot 10^{-4} m^2$).

EXAMPLE 1

An edible dispersion comprising 40 wt.% continuous fat phase and 60 wt.% dispersed aqueous phase was prepared using the following ingredients:

Fat phase composition:
30 wt.% fish oil hydrogenated to a melting point of 40° C.
69 wt.% sunflower oil
0.7 wt.% monoglycerides derived from sunflower oil hydrogenated to a melting point of 44° C.
0.018 wt % beta-carotene Aqueous phase composition:
0.2 wt.% Dairy Crest ® skimmed milk powder
0.26 wt.% Carberry ® whey powder
0.74 wt.% NaCl
0.2 wt.% potassium sorbate
0.09 wt.% citric acid
0.6 wt.% iota-carrageenan
98 wt.% tapwater The wheypowder contained 0.09 wt.% $Na^+$, 0.25 wt.% $K^+$, 0.45 wt.% $Ca^+$ and 1.5 wt.% ash. The skimmed milk powder contained 0.53 wt.% $Na^+$, 1.67 wt.% $K^+$, 1.18 wt.% $Ca^{2+}$ and 7.5 wt.% ash.

The iota-carrageenan contained 7.1 wt.% $Na^+$, 1.83 wt.% $K^+$, 0.03 wt.% $Ca^{2+}$ and 0.03 wt.% $Mg^{2+}$. The tapwater contained 133 ppm $Ca^{2+}$, 6 ppm $Mg^{2+}$, 6 ppm $K^+$ and 37 ppm $Na^+$.

The aqueous phase composition formed a gel when left to stand at ambient temperature The Tm-value was 45° C. and the yield stress at 5° C. was 2 $kN/m^2$.

A water continuous emulsion was prepared by mixing the fat phase and the aqueous phase compositions. The emulsion was pasteurized at 80° C. and then passed through a surface scraped heat exchanger of the Votator A-unit ® type at a capacity of about 3 kg/min. The rotor speed of the A-unit was 500 rpm which provided sufficiently high shear to prevent setting of the iota-carrageenan gel. The O/W emulsion left the A-unit having a temperature of about 7° C. The emulsion was then caused to invert into an oil continuous dispersion by passing it through a stirred crystallizer of the Votator C-unit ® type operated at a rotor speed of 1000 rpm. The composition left the C-unit having a temperature of 19° C. The dispersion was then further plastified by passage through another A-unit and another C-unit from which the dispersion discharged at temperatures of about 12° C. and 16° C., respectively. The product was filled into tubs and stored for 2 weeks at 5° C.

The product was excellent and had in particular a very good oral response. It did not release water when it was spread.

For comparison, the experiment was repeated using an aqueous phase composition containing instead of iota-carrageenan, 1.4 wt.% gelatin. The two products were tested against each other in a panel test. No significant difference between the two products was found.

EXAMPLE 2

A fat spread containing 40 wt.% fat was prepared with the following ingredients.

Fat phase composition:
40 wt.% soybean oil hydrogenated to a melting point of about 38° C.
59 wt.% soybean oil
0.5 wt.% soybean lecithin
0.5 wt.% Dimodan P$^R$ (distilled monoglycerides)
0.04 wt.% beta-carotene Aqueous phase composition:
1.5 wt.% Dairy Crest® skimmed milk powder
1.0 wt.% NaCl
0.1 wt.% potassium-sorbate
0.09 wt.% citric acid
1.0 wt.% kappa-carrageenan
98 wt.% tapwater The composition of the skimmed milk powder and of the tapwater was the same as in example 1. The kappa-carrageenan contained 2.48 wt.% $K^+$, 4.82 wt.% $Na^+$, 0.043 wt.% $Ca^{2+}$ and 0.033 wt.% $Mg^{2+}$.

The aqueous phase composition formed a gel when left to stand at ambient temperature. The Tm-value was 32° C. and the yield stress at 5° C. was 8.5 $kN/m^2$.

An oil-in-water emulsion was prepared by continuously admixing 40 parts by weight of fat phase composition with 60 parts by weight aqueous phase composition of a total capacity of about 3 kg/hour, by means of a proportioning pump.

The composition was then passed through a C-unit, an A-unit, a C-unit, an A-unit and another C-unit. All three C-units were chilled The temperature of the composition after each unit down the line was 28, 21, 20, 19 and 18° C., respectively. Samples were taken after the first C-unit and after the first A-unit. Both contained a significant amount of bits of gelled aqueous phase, although the overall samples and especially the one taken after the first C-unit, still appeared to have a continuous aqueous phase. The product leaving the production line had a continuous fat phase. It was filled into tubs and stored at 5° C. for two weeks.

The product was acceptable. It had in particular a good break down behaviour in the mouth. However, it released some water when it was spread. Investigation of the product under the microscope, while heating the sample slowly, showed that it contained bits of broken gel having irregular shape, whereas no such irregularly shaped bits of gel were present in either of the two spreads described in example 1.

EXAMPLE 3

An edible dispersion comprising 40 wt.% continuous fat phase and 60 wt.% dispersed aqueous phase was prepared using the following ingredients:

Fat phase composition:
25.3 wt.% fish oil hydrogenated to a melting point of 40° C.
74 wt.% sunflower oil
0.7 wt.% monoglycerides derived from sunflower oil hydrogenated to a melting point of 44° C.
0.018 wt.% beta-carotene.

Aqueous phase composition:
0.2 wt.% Carberry® whey powder
0.02 wt.% potassium sorbate
0.05 wt.% sodium chloride
1.0 wt.% kappa-carrageenan
0.5 wt.% locust bean gum
98 wt.% tapwater.

The composition of the whey powder and the tapwater was the same as in Example 1. The kappa-carrageenan contained 5.70 wt.% $Na^+$, 0.03 wt.% $K^+$, 0.02 wt.% $Ca^{2+}$ and 0.01 wt.% $Mg^{2+}$.

The aqueous phase composition formed a gel when left to stand at 10° C. The Tm-value was 13° C. and the yield stress at 5° C. was 52 $kN/m^2$. (Synergism occurs between locust bean gum and kappa-carrageenan, causing the gel to have a relatively high gel strength.)

A water continuous emulsion was prepared by mixing the fat phase and the aqueous phase compositions. The emulsion was pasteurized at 80° C. and then passed through a stirred crystallizer of the Votator C-unit® type operated at a rotor speed of 1000 rpm and through a scraped surface heat exchanger of the Votator A-unit® type, operated at 1000 rpm. The oil-in-water emulsion left the A-unit at a temperature of 18° C. The emulsion was then allowed to invert by passing it through a C-unit operated at 1700 rpm. The composition left the C-unit at a temperature of 20° C. It was then passed through a cooling coil to cause gelation of the aqueous phase. The dispersion was then further plastified by passage through another A-unit and another C-unit from which the dispersion was discharged at temperatures of about 11° C. and 11° C., respectively. The product was filled into tubs and stored for two weeks at 5° C.

The product was excellent and had in particular a good spreadability. It was soft and plastic and spread very smoothly without loss of water. The oral response was also very good.

We claim:

1. Edible dispersion which comprises 15–90 wt.% of a dispersed aqueous phase and 10–85 wt.% of a continuous fat phase, the composition constituting the aqueous phase being a gel-forming composition comprising carrageenan and containing a cation (A) selected from the group consisting of potassium, calcium, magnesium and mixtures thereof in a concentration effective to cause the gel-forming composition to have a transition midpoint temperature in the range of 10°–45° C., the carrageenan being selected from the group consisting of kappa-carrageenan, iota-carrageenan and a mixture thereof, said carrageenan present in the amount of 0.1–10 parts per 100 parts by weight of any water included within said dispersion, said gel-forming composition capable of forming a gel having a yield stress of at least 0.5 $kN/m^2$ at 5° C.

2. Dispersion according to claim 1, wherein the gel-forming composition further contains a cation (B) which is sodium.

3. Dispersion according to claim 1, wherein the gel-forming composition has a transition midpoint temperature of 15°–35° C.

4. Dispersion according to claim 1, wherein the gel-forming composition forms a gel having a yield stress of 1–100 $kN/m^2$ at 5° C.

5. Dispersion according to claim 4, wherein the gel-forming composition forms a gel having a yield stress of 2–50 $kN/m^2$ at 5° C.

6. Dispersion according to claim 1, wherein the gel-forming composition comprises 0.2-5 parts by weight of carrageenan per 100 parts by weight of water.

7. Dispersion according to claim 6, wherein the gel-forming composition comprises 0.4-3 parts by weight of carrageenan per 100 parts by weight of water.

8. Dispersion according to claim 2, wherein the gel-forming composition contains cations (A) and (B), dependent upon a weight ratio of kappa- and iota-carrageenan present in the composition, in concentrations within the ranges corresponding to space ABCDEFGH of FIG. 3.

9. Dispersion according to claim 8, wherein the gel-forming composition contains cations (A) and (B), in dependence of the weight ratio of kappa- and iota-carrageenan present in the composition, in concentrations within the ranges corresponding to space ABCDEFGH of FIG. 5.

10. Dispersion according to claim 2, wherein the gel-forming composition comprises 0.2-5 parts by weight of carrageenan per 100 parts by weight of water, and contains 0.01-0.25 wt.% potassium, 0.1-2 wt.% sodium, and 0.04-3 wt.% calcium, the carrageenan consisting of 50-100 wt.% kappa-carrageenan and 0-50 wt.% iota-carrageenan.

11. Dispersion according to claim 2, wherein the gel-forming composition comprises 0.2-5 parts by weight of carrageenan per 100 parts by weight of water, and contains 0.05-0.5 wt.% potassium, 0.05-1 wt.% sodium, 0.01-0.7 wt.% calcium, and 0.01-0.7 wt.% magnesium, the carrageenan consisting of 0-50 wt.% kappa-carrageenan and 50-100 wt.% iota-carrageenan.

12. Dispersion according to claim 1, comprising 35-85 wt.% dispersed aqueous phase and 15-65 wt.% fat phase.

13. Dispersion according to claim 2, wherein the gel-forming composition comprises 0.2-5 parts by weight of carrageenan per 100 parts by weight of water, and contains 0.05-0.5 wt.% potassium, 0.05-1 wt.% sodium, and 0.01-0.7 wt.% magnesium, the carrageenan consisting of 0-50 wt.% kappa-carrageenan and 50-100 wt.% iota-carrageenan.

14. Dispersion according to claim 2, wherein the gel-forming composition comprises 0.2-5 parts by weight of carrageenan per 100 parts by weight of water, and contains 0.05-0.5 wt.% potassium, 0.05-1 wt.% sodium, and 0.01-0.7 wt.% calcium, the carrageenan consisting of 0-50 wt.% kappa-carrageenan and 50-100 wt.% iota-carrageenan.

* * * * *